United States Patent
Hattori et al.

(10) Patent No.: US 9,497,395 B2
(45) Date of Patent: Nov. 15, 2016

(54) NIGHT-VISION DEVICE

(71) Applicant: DENSO CORPORATION, Kariya, Aichi-pref. (JP)

(72) Inventors: Kazushige Hattori, Kariya (JP);
Hirotaka Suzuki, Toyota (JP);
Nobuhiko Inoue, Nagoya (JP);
Kazuhide Ohta, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/654,693

(22) PCT Filed: Dec. 12, 2013

(86) PCT No.: PCT/JP2013/007317
§ 371 (c)(1),
(2) Date: Jun. 22, 2015

(87) PCT Pub. No.: WO2014/103223
PCT Pub. Date: Jul. 3, 2014

(65) Prior Publication Data
US 2015/0350572 A1    Dec. 3, 2015

(30) Foreign Application Priority Data
Dec. 27, 2012 (JP) .................. 2012-284577

(51) Int. Cl.
*H04N 5/33* (2006.01)
*G06K 9/00* (2006.01)
(Continued)

(52) U.S. Cl.
CPC .............. *H04N 5/332* (2013.01); *G02B 23/12* (2013.01); *G06K 9/00362* (2013.01);
(Continued)

(58) Field of Classification Search
CPC ............ H04N 5/332; G06K 9/00362; G06K 9/00791
See application file for complete search history.

(56) References Cited

U.S. PATENT DOCUMENTS

2002/0001464 A1* 1/2002 Ohsawa ............. G03B 7/09979
396/50

FOREIGN PATENT DOCUMENTS

JP    2005-176031 A    6/2005
JP    2007-156832 A    6/2007
(Continued)

OTHER PUBLICATIONS

International Search Report of the International Searching Authority dated Jan. 21, 2014 issued in the corresponding International application No. PCT/JP2013/007317 (and English translation).
(Continued)

*Primary Examiner* — Casey Bryant
(74) *Attorney, Agent, or Firm* — Posz Law Group, PLC

(57) ABSTRACT

A night-vision device is provided with a projection unit, an image pickup unit, a luminance ratio determining unit, and a projection control unit. The luminance ratio determining unit determines whether a determination luminance ratio in a set region is within a predetermined luminance range as a luminance ratio at which a subject to be detected forms an emphasized image, said set region having been set at least in a part of an image obtained by means of the image pickup unit. In the cases where the determination luminance ratio is out of the predetermined luminance range, the projection control unit controls the intensity of near-infrared light emitted from the projection unit such that the determination luminance ratio is within the predetermined luminance range.

7 Claims, 6 Drawing Sheets

(51) Int. Cl.
*H04N 7/18* (2006.01)
*G02B 23/12* (2006.01)
*G08G 1/16* (2006.01)

(52) U.S. Cl.
CPC ......... *G06K 9/00791* (2013.01); *H04N 7/183* (2013.01); *H04N 7/188* (2013.01); *G06K 2209/21* (2013.01); *G08G 1/166* (2013.01)

(56) References Cited

FOREIGN PATENT DOCUMENTS

| | | | |
|---|---|---|---|
| JP | 2007-282022 A | 10/2007 | |
| JP | 2008-135856 A | 6/2008 | |
| JP | 2010-161459 A | 7/2010 | |
| JP | 2012-27773 A | 2/2012 | |

OTHER PUBLICATIONS

Written Opinion of the International Searching Authority dated Jan. 21, 2014 issued in the corresponding International application No. PCT/JP2013/007317 (and English translation).

* cited by examiner

| R | G | R | G | R | G | ... | |
| R | IR | B | IR | B | IR | ... | |
| R | G | R | G | R | G | ... | |
| B | IR | B | IR | B | IR | ... | |
| ⋮ | ⋮ | ⋮ | ⋮ | ⋮ | ⋮ | | |
| | | | | | | | |

OPTICAL FILTER

OBJECT TO BE
DETECTED
(PEDESTRIAN)

OBJECT TO BE
DETECTED
(PEDESTRIAN)

NIGHT-VISION DEVICE

CROSS REFERENCE TO RELATED APPLICATIONS

The present disclosure is a U.S. national stage of International Application No. PCT/JP2013/007317 filed on Dec. 12, 2013 and is based on Japanese Patent Application No. 2012-284577 filed Dec. 27, 2012, the entire contents of which are incorporated herein by reference.

TECHNICAL FIELD

The present disclosure relates to a night-vision device mounted to a vehicle.

BACKGROUND ART

Conventionally, a night-vision device mounted to a vehicle, so-called "a night-vision system" is known (refer to PTL 1). The night-vision device of this type includes a projector that emits near infrared rays to a specified space defined around the vehicle, an image pickup device receiving light including the near infrared rays from the specified space to generate an image, and a display device displaying the image picked up by the image pickup device.

Some of the night-vision devices of this type detect an object to be detected such as a pedestrian on the basis of the image picked up by the image pickup device, and inform the presence of the object to be detected.

PRIOR ART DOCUMENT

Patent Literature

PTL 1: JP 2007-156832 A

SUMMARY OF INVENTION

Problem to be Solved by the Invention

In the night-vision device of this type, an improvement in the visibility of an image displayed on the display device is required, and the image generated by the image pickup device in the night-vision device is required to be a color image.

In order to realize the requirements, some of the image pickup devices used in the night-vision device include multiple light receiving elements arranged in a mosaic pattern (a matrix pattern), a visible light filter that passes a visible light, and a near infrared filter that passes near infrared rays.

Generally, each light receiving element used in the night-vision device has a light sensitivity in wavelength regions from the visible light to the near infrared rays, and outputs a signal of a magnitude corresponding to a received light intensity through or not through any one of a visible light filter passing visible light and near infrared rays that include specific color information for generating a color image, and a near infrared filter passing only the near infrared rays. The visible light filter is a band pass filter having RGB or CyMgYeG generally arrayed in Bayer. The near infrared filter is a band pass filter that passes only a longer wavelength side from wavelengths of about 600 nm to 800 nm generally. The filter provided in the image pickup device for realizing the color image realizes a night-vision device excellent in color reproducibility by adding the near infrared filter to the visible light filter, such as an RGB-IR filter in which one pixel of RGBG included in basic pixel units arrayed in Bayer is replaced with the near infrared filter, or a CyMgYe-IR filter in which G of CyMgYeG is replaced with the near infrared filter.

The image pickup device generates an image including multiple pixels having a sum of a luminance value of the near infrared rays and a luminance value of the visible light that are detected by the light receiving elements adjacent to each other as a luminance value of each pixel. In the image picked up by the image pickup device in the night-vision device, an object to be detected such as a pedestrian is required to be emphasized (exhilarated) as compared with a periphery of the object to be detected.

In order to obtain the image in which the object to be detected is emphasized, it is conceivable that a ratio of the luminance value of the near infrared rays and the luminance value of the visible light from the object to be detected falls within a predetermined range. However, recently, in order to suppress a temperature rise in the vehicle interior, a window shield that cuts light having a wavelength of an infrared region is used in a vehicle. When the window shield is used, such a problem that an intensity of the near infrared rays from the object to be detected, which is received by the image pickup device, may be lowered, and the image generated based on the light received by the image pickup device may not become the image in which the object to be detected is emphasized may occur.

When the luminance around the subject vehicle changes due to street lights or light of an oncoming vehicle, such a problem that the ratio of the luminance value of the near infrared rays and the luminance value of the visible light from the object to be detected, which is received by the image pickup device, does not fall within the predetermined range may occur.

In the conventional technology, the image in which the object to be detected is emphasized (exhilarated) may not be generated by disturbance. It is an object of the present disclosure to generate an image in which an object to be detected is emphasized in a night-vision device.

Solution to Solve Problem

A night-vision device according to an aspect of the present disclosure is mounted to a vehicle, and includes a light projecting unit, an image pickup unit, a luminance ratio determining unit, and a light projection control unit. The light projecting unit emits near infrared rays to a predetermined emission range as a spatial region around a subject vehicle.

The image pickup unit receives a light from a specified space defined as the spatial region around the subject vehicle including the emission range through any of a near infrared filter that passes near infrared rays and a visible light filter that passes visible light by each of multiple light receiving elements arrayed in a mosaic pattern, and obtains an image signal representing an image in which the specified space is projected onto a plane including multiple pixels each having the luminance value of the near infrared rays and the luminance value of the visible light.

A set region corresponds to a region that is set in at least a part of the image represented by the image signal obtained by the image pickup unit, and includes at least one pixel in which an object to be detected is likely to be present. The luminance ratio determining unit executes a luminance ratio determination determining whether a determination luminance ratio that is a ratio of the luminance value of the near infrared rays and the luminance value of the visible light in the pixels defining the set region falls within a predetermined specified luminance range that is a range of the ratio of the luminance value of an image in which the object to be detected is emphasized.

When the determination luminance ratio exceeds the specified luminance range as a result of the luminance ratio determination in the luminance ratio determining unit, the light projection control unit executes light projection control that controls the intensity of the near infrared rays emitted by the light projecting unit so that the determination luminance ratio falls within the specified luminance range.

According to the night-vision device, it may be possible to pick up an image that enables to improve a detection performance of the object to be detected while improving the visibility.

BRIEF DESCRIPTION OF DRAWINGS

The above or other objects, configurations and advantages of this disclosure will become more apparent from the following detailed description with reference to the following drawings. In the drawings.

Figure 1:
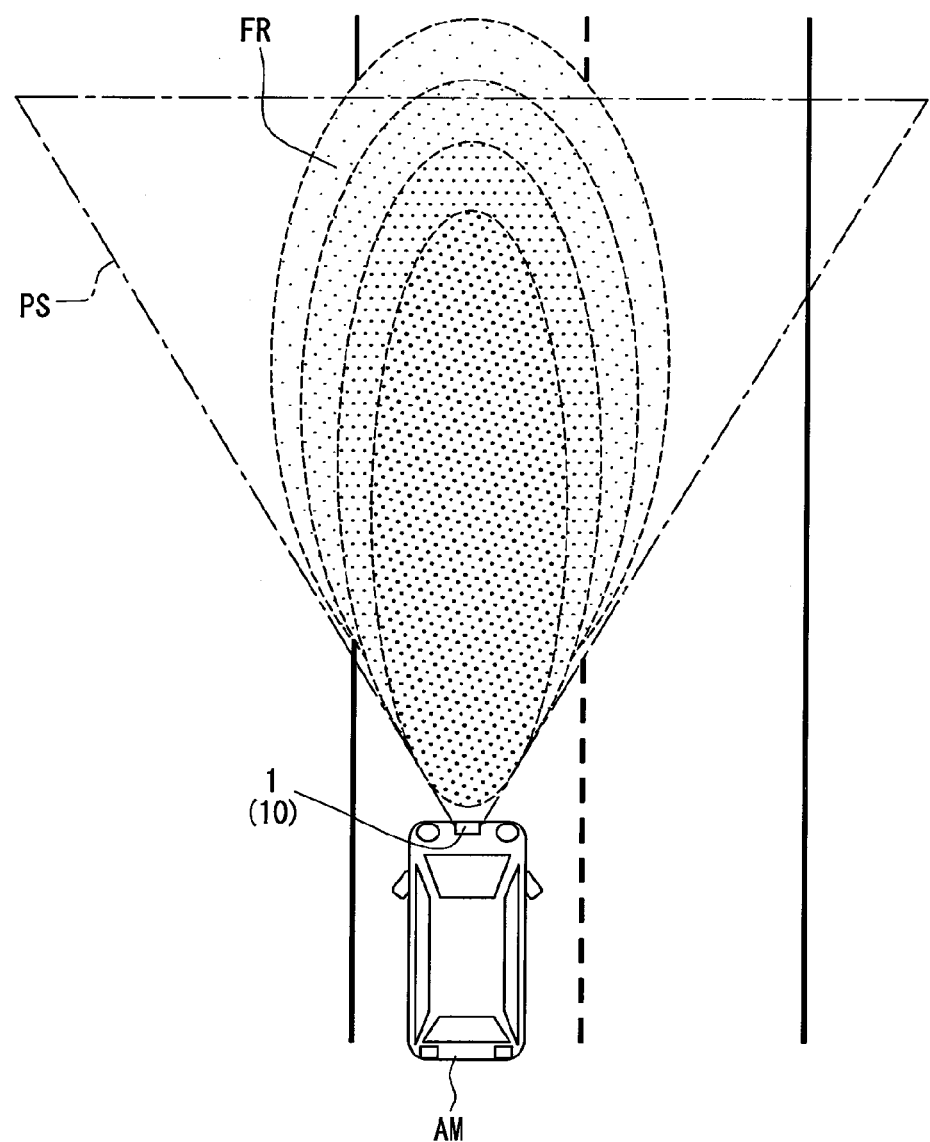
FIG. 1 is a diagram illustrating an outline of a night-vision device according to a first embodiment of the present disclosure.

PREFERRED EMBODIMENTS FOR CARRYING OUT THE INVENTION (First Embodiment)

A night-vision device 1 according to a first embodiment of the present disclosure will be explained with referring to the drawings. The night-vision device 1 is a so-called "vehicle night-vision system" mounted in a vehicle AM in use. The vehicle AM mounted with the night-vision device 1 may also be referred to as a "subject vehicle AM".

The night-vision device 1 emits near-infrared rays to an emission range FR defined as a spatial region around the subject vehicle, and images and informs a status of a specified space PS defined as a space including the emission range FR. The emission range FR in the embodiment defines a space including a road and right and left sides of the road present in a traveling direction of the subject vehicle.

Figures 2, 3:
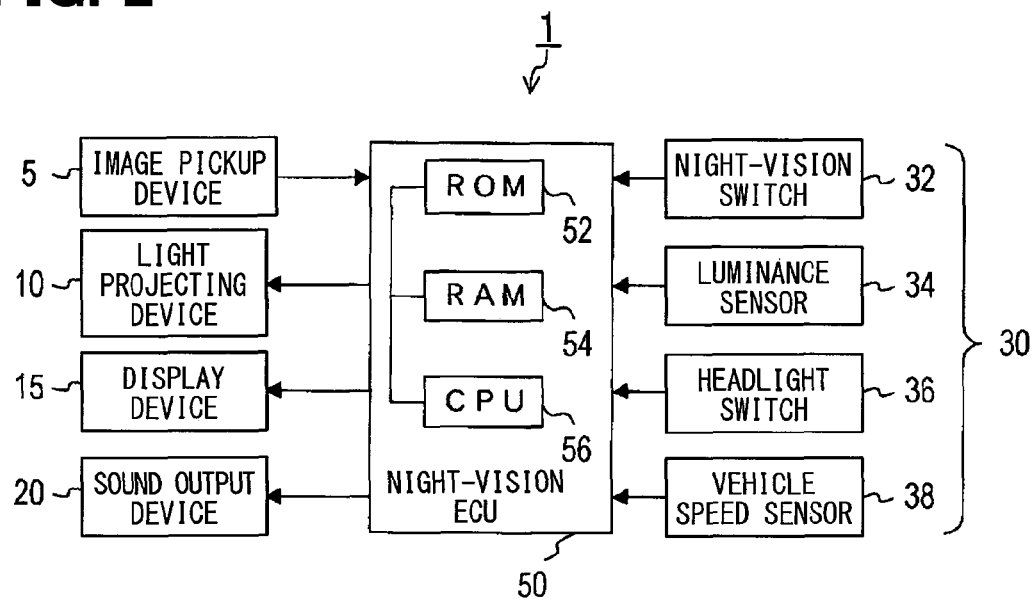
FIG. 2 is a block diagram illustrating a schematic configuration of a night-vision device according to the first embodiment.
FIG. 3 is a diagram illustrating a structure of an optical filter.

As illustrated in FIG. 2, the night-vision device 1 includes an image pickup device 5, a light projecting device 10, a display device 15, a sound output device 20, a switch sensor group 30, and a night-vision electronic control device (hereinafter, referred to as a night-vision ECU) 50.

The light projecting device 10 is a known projector that emits the near-infrared rays that are a light having a wavelength of a near infrared region according to a control signal from the night-vision ECU 50. The light projecting device 10 according to the embodiment is arranged to emit the near infrared rays to the emission range FR.

The intensity of the near infrared rays emitted by the light projecting device 10 becomes higher toward a center of the emission range FR, and becomes lower with distance from the center of the emission range FR. The light projecting device 10 may be realized by a single projector, or may be realized by multiple projectors.

The display device 15 is a known display device that displays an image (a video picture) or an indicator for warning according to a signal from the night-vision ECU 50. The display device 15 may be a known liquid crystal display of a known navigation device, a known head-up display, a monitor disposed in an instrument panel, or an indicator lamp.

The sound output device 20 is a device that converts an electric signal from the night-vision ECU 50 into sound, and outputs the sound, which is a so-called speaker. The switch sensor group 30 is a switch and sensor group that obtains diverse information representing states of the subject vehicle and the night-vision device 1. The switch sensor group 30 includes a night-vision switch 32, a luminance sensor 34, a headlight switch 36, and a vehicle speed sensor 38.

The night-vision switch 32 is a switch that receives an input of a start instruction of the night-vision device 1 from an external portion. The luminance sensor 34 is a sensor that detects the luminance around the subject vehicle. The headlight switch 36 is a known switch that switches on and off to switch on or off of headlights provided in the subject vehicle. The vehicle speed sensor 38 is a known sensor that detects a vehicle speed of the subject vehicle.

The image pickup device 5 is a known image pickup device including an imaging element, an optical lens, an optical filter, and a peripheral electronic circuit such as a power supply, and picks up an image through the imaging element. The image pickup device 5 in the embodiment is disposed so that the specified space PS is an imaging region.

The image pickup device 5 may be located in a vehicle interior. In this case, the image pickup device 5 may be located in the vicinity of a room mirror so as to image the specified space PS through a window shield that cuts a light having a wavelength of an infrared region including the near infrared rays. The image pickup device 5 may be located in front of the subject vehicle AM. In that case, the image pickup device 5 may be located in a front grille or a bumper of the subject vehicle AM.

The imaging element in the embodiment is a known imaging element having multiple light receiving elements arrayed in a mosaic pattern (a matrix pattern), and for example, a known CCD image sensor or a known CMOS image sensor.

As illustrated in FIG. 3, the optical filter according to the embodiment includes a near-infrared filter (IR) and a visible light filter (R, G, B). The visible light filter (R, G, B) is a filter that passes at least light having a wavelength of the visible light region, and includes a red filter (R), a green filter (G), and a blue filter (B).

The optical filter is configured so that the near-infrared filter (IR), the red filter (R), the green filter (G), and the blue filter (B) are arranged in a matrix pattern. Each of the near-infrared filter (IR), the red filter (R), the green filter (G), and the blue filter (B) is disposed to cover a light receiving surface of the light receiving elements in the imaging element.

Figure 4:
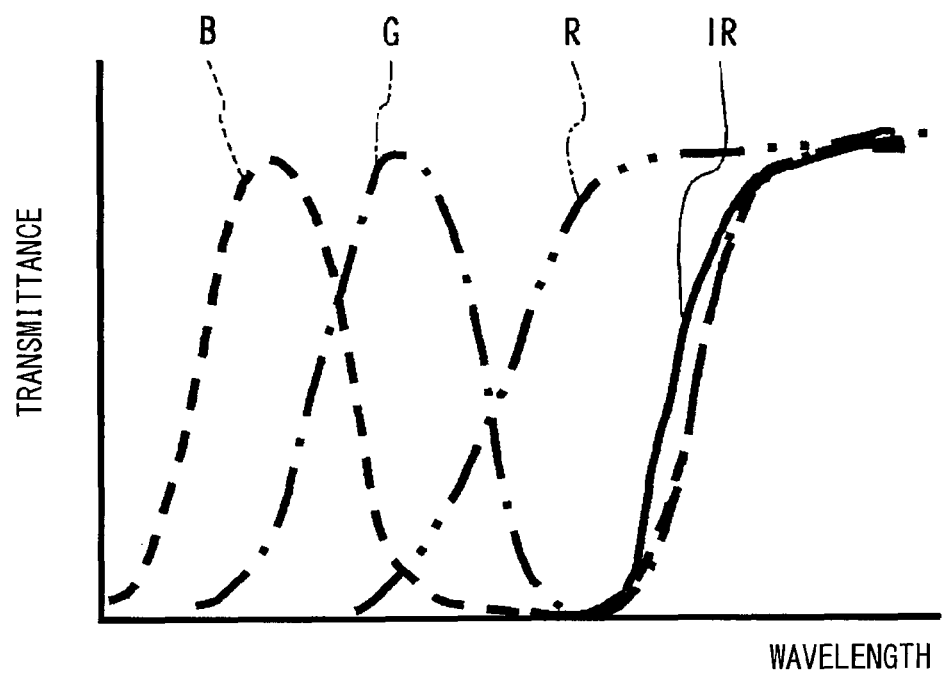
FIG. 4 is a diagram illustrating a transmission characteristic of the optical filter.

As illustrated in FIG. 4, the red filter (R) is a known filter that passes the light having a wavelength of red configuring three primary colors of the light, and the light (that is, near infrared rays) having the wavelength of the near infrared region. As illustrated in FIG. 4, the green filter (G) is a known filter that passes the light having a wavelength of green configuring the three primary colors of the light, and the light having the wavelength of the near infrared region. As illustrated in FIG. 4, the blue filter (B) is a known filter that passes the light having a wavelength of blue configuring the three primary colors of the light, and the light having the wavelength of the near infrared region.

As illustrated in FIG. 4, the near-infrared filter (IR) is a filter that passes the near infrared rays. The image pickup device 5 according to the embodiment generates an image including multiple pixels with a sum of a luminance value of the near infrared rays and a luminance value of the visible light which are detected by the four light receiving elements adjacent to each other as a luminance value of one pixel. That is, since each pixel has only color information of a single color, the color information is complemented by collecting missing color information from the peripheral pixels of each pixel.

Specifically, in FIG. 3, when the luminance value of the most upper left pixel is calculated, the luminance value detected by the upper left light receiving element is a red luminance value. The luminance value detected by a light receiving element down adjacent to the upper left pixel is a blue luminance value, the luminance value detected by the light receiving element right adjacent to the upper left pixel is a green luminance value, and the luminance value detected by a lower right light receiving element to the upper left pixel is a near infrared luminance value. Therefore, the color information is complemented by the use of the blue luminance value, the green luminance value, and the near infrared luminance value adjacent to the upper left pixel. Since a method for complementing the color information is well known, the detailed explanation will be omitted. For example, the luminance value of a pixel to be a target is set to a sum of the red luminance value, the blue luminance value, the green luminance value, and the near infrared luminance value adjacent to each other.

The night-vision ECU 50 mainly includes a known computer having at least a ROM 52 that stores a processing program and data whose storage contents need to be retained even when a power supply turns off, a RAM 54 that temporarily stores the processing program and the data, and a CPU 56 that executes various processing according to the processing program stored in the ROM 52 or the RAM 54.

The processing program for causing the CPU 56 to execute night-vision processing for at least emitting the near infrared rays to the emission range FR from the light projecting device 10 and executing night-vision display that displays an image generated by the image pickup device 5 on the display device 15 is stored in the ROM 52 of the night-vision ECU 50. The night-vision processing starts by a flag for turning on an ignition switch or turning on a night-vision switch.

Figure 5:
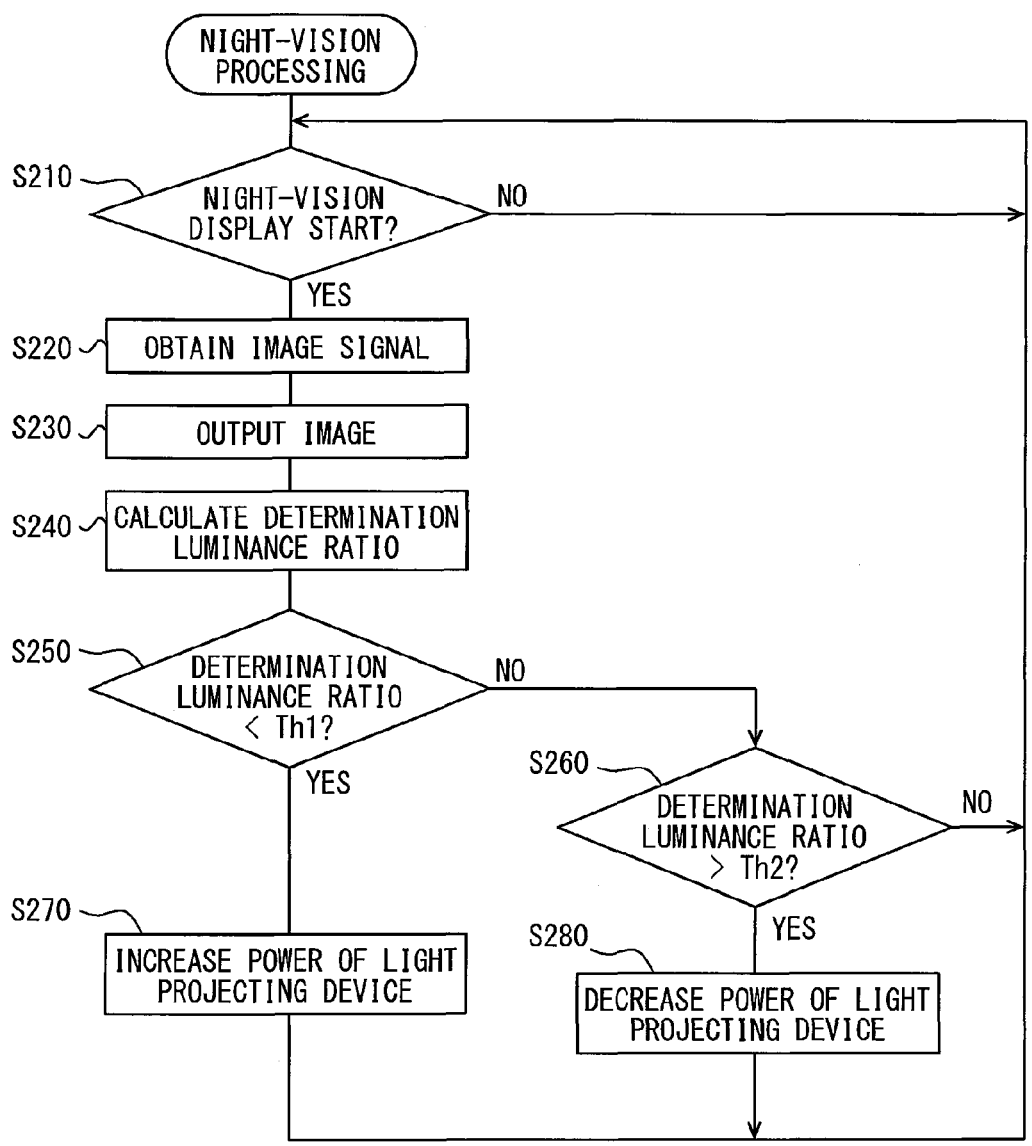
FIG. 5 is a flowchart illustrating a procedure of navigation processing.

When the night-vision processing starts, as illustrated in FIG. 5, it is initially determined whether a start condition of the night-vision display is satisfied (S210). The night-vision display means that the near infrared rays are emitted to the emission range FR from the light projecting device 10 and the image generated by the image pickup device 5 is displayed on the display device 15.

The start condition of the night-vision display in the embodiment is to receive the input of the start instruction through the night-vision switch 32. A condition to obtain an image generated by the image pickup device 5 among the start condition of the night-vision display may be that the luminance detected by the luminance sensor 34 may be equal to or lower than a specified luminance that is predetermined as the luminance representing night, that the headlight switch 36 may turn on, or that both of the conditions may be satisfied. Further, a condition under which the light projecting device 10 emits the near infrared rays among the start condition of the night-vision display may be that a vehicle speed detected by the vehicle speed sensor 38 may be equal to or higher than a prescribed vehicle speed that is defined in advance.

When the start condition of the night-vision display is satisfied (NO at S210), the process waits until the start condition of the night-vision display is satisfied. When the start condition of the night-vision display is satisfied (YES at S210), the process proceeds to S220. In the embodiment, even when the night-vision display is not performed, an image (a video picture) may be displayed on the display device 15 when the light projecting device does not emit the light.

At S220, an image signal that represents an image picked up by the image pickup device 5, a so-called RAW image, is obtained. Subsequently, the image based on the image signal obtained at S220 is output to the display device 15 (S230). At S230, the display device 15 displays an image in which the specified space PS is projected onto a plane having the multiple pixels.

At the night-vision processing at S230, an object to be detected such as a pedestrian or a light vehicle is detected on the basis of the image signal obtained at S220 and the presence of the object to be detected is informed. Since the process detecting the object to be detected is well known, the detailed description will be omitted. For example, as a result of checking a feature model prepared in advance as a model representing a feature of the object to be detected against a region of the image in which the near infrared luminance value is high, a region in which a matching degree is equal to or higher than a specifed threshold may be detected as the object to be detected. In this case, the feature model may be multiple models representing features of parts of a person, or may be configured by a template representing the features of the overall person.

The notification of the presence of the object to be detected may be implemented by superimposing a mark that enables to identify the object to be detected on an image displayed on the display device 15, implemented by outputting the presence of the object to be detected through the sound output device 20, or implemented by executing both of the manners.

A ratio (hereinafter, referred to as a determination luminance ratio) PR of a red luminance value to a near infrared luminance value in the set region that is set in at least a part of the image obtained at S220 is calculated (S240).

The set region in the embodiment is a region in which the object to be detected is likely to be present in the image. The region in which the object to be detected is likely to be present includes a region corresponding to the ends of the emission range FR in a horizontal direction in the image, and at least one of right and left sides of a road on which the subject vehicle AM travels. The right and left sides of the road include roadsides or shoulders in the road, or sidewalks.

Specifically, the derivation of the determination luminance ratio RR at S240 is performed by dividing a total of the red luminance values in all of the pixels configuring the set region by a total of the near infrared luminance values in all of the pixels configuring the set region.

It is determined whether the determination luminance ratio RR calculated at S240 is less than the specified threshold Th1 that is defined in advance (S250). When the determination luminance ratio RR is less than the specified threshold Th1 as a result of the determination (YES at S250), the process proceeds to S270 to be described later in detail.

On the other hand, when the determination luminance ratio RR is equal to or higher than the specified threshold Th1 as a result of the determination at S250 (NO at S250), it is determined whether the determination luminance ratio RR is larger than a specified threshold Th2 defined in advance (S260).

The specified threshold Th1 is a lower limit value of a predetermined specified luminance range as a range of the ratio of the luminance of the image in which the object to be detected is emphasized by an experiment or the like, and the specified threshold Th2 is an upper limit value of the specified luminance range.

When the determination luminance ratio RR falls below the specified luminance range as a result of the luminance ratio determination, the process proceeds to S270. At S270, the light projection control performs a projection control to control the light projecting device 10 so that the intensity of the near infrared rays emitted by the light projecting device 10 is amplified. In the light projection control of the embodiment, an upper limit of the intensity of the near infrared rays emitted by the light projecting device 10 may be defined. In this case, the upper limit of the intensity of the near infrared rays may have an intensity that does not affect the ability of the light projecting device 10, and a human body.

In the light projection control executed at S270, an increased amount in the intensity of the near infrared rays to be increased until the determination luminance ratio RR falls within the specified luminance range is calculated. The intensity is changed in a stepwise manner so that the calculated increased amount is realized for each predetermined specified value. In the embodiment, the change in the stepwise manner means, for example, that the intensity increases on the specified value basis every time a series of cycles from S210 to S280 are executed.

The process returns to S210. When the determination luminance ratio RR is equal to or lower than the specified threshold Th2 as a result of the determination at S260 (NO at S260), the process returns to S210 without changing the intensity of the near infrared rays emitted from the light projecting device 10 assuming that the determination luminance ratio RR falls within the specified luminance range.

When the determination luminance ratio RR is higher than the specified threshold Th2 (YES at S260) as a result of the determination at S260, that is, when the determination luminance ratio RR exceeds the specified luminance range as a result of the luminance ratio determination, the process proceeds to S280.

At S280, the light projection control for controlling the light projecting device 10 is executed so as to reduce the intensity of the near infrared rays emitted by the light projecting device 10. In the light projection control executed at S270, a decrement in the intensity of the near infrared rays to be decreased until the determination luminance ratio RR falls within the specified luminance range is calculated, the intensity is changed in a stepwise manner so that the calculated decrement is realized for each predetermined specified value. In the embodiment, the change in the stepwise manner means, for example, that the intensity decreases on the specified value basis every time a series of cycles from S210 to S280 are executed. Thereafter, the process returns to S210.

As described above, in the night-vision processing of the embodiment, when the determination luminance ratio RR falls below the specified luminance range, the light projection control for controlling the light projecting device 10 is executed so as to amplify the intensity of the near infrared rays. On the other hand, when the determination luminance ratio RR exceeds the specified luminance range, the light projection control for controlling the light projecting device 10 is executed so as to reduce the intensity of the near infrared rays.

As a result, according to the night-vision device 1, it is possible to emit the near infrared rays having an appropriate intensity toward the emission range FR, which is a partial space of the specified space PS having high possibility that the object to be detected is present. Even when a window shield that cuts the light of the wavelength of the infrared region is used for the subject vehicle AM, it is possible that the ratio of the luminance value of the near infrared rays and the luminance value of the visible light from the object to be detected is in the specified luminance range.

Figure 6A:
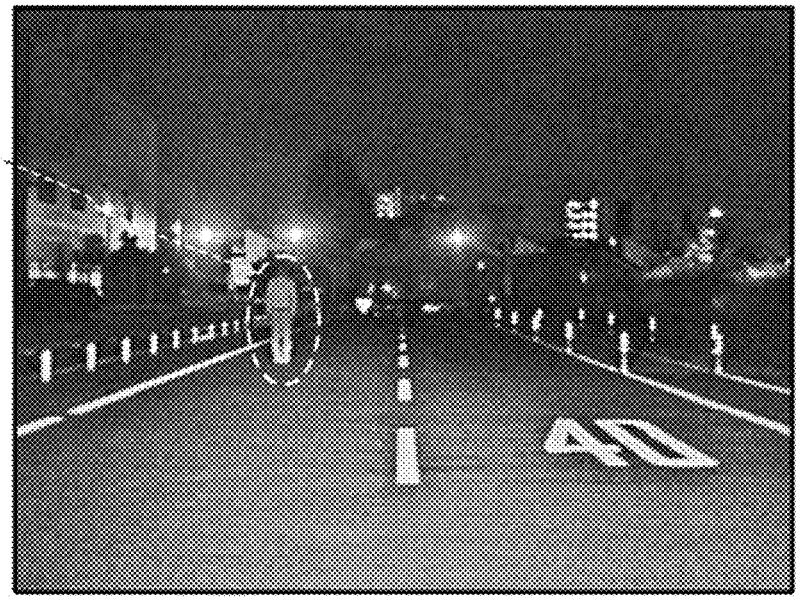
FIG. 6A is an image picked up by a conventional night-vision device.

Specifically, in the conventional technology, the window shield that cuts the light of the wavelength of the infrared ray region is used in the subject vehicle AM, and in a night-vision device that images the light input through the window shield, the ratio of the luminance value of the near infrared rays and the luminance value of the visible light from the object to be detected cannot fall within the specified luminance range. For this reason, the image picked up by the conventional night-vision device suffers from a problem that the object to be detected blends into the periphery, and an image in which the object to be detected is emphasized (stands out) is not obtained as illustrated in FIG. 6A and FIG. 6C.

Figure 6B:
FIG. 6B is an image picked up by a night-vision device according to the first embodiment.
Figure 6C:
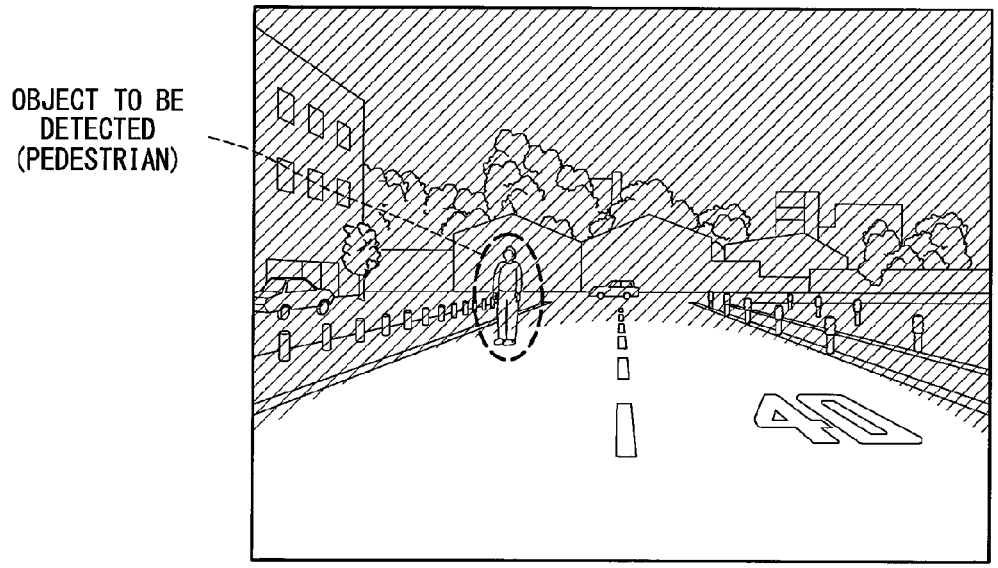
FIG. 6C is an outline view of an image picked up by a conventional night-vision device illustrated in FIG. 6A.
Figure 6D:
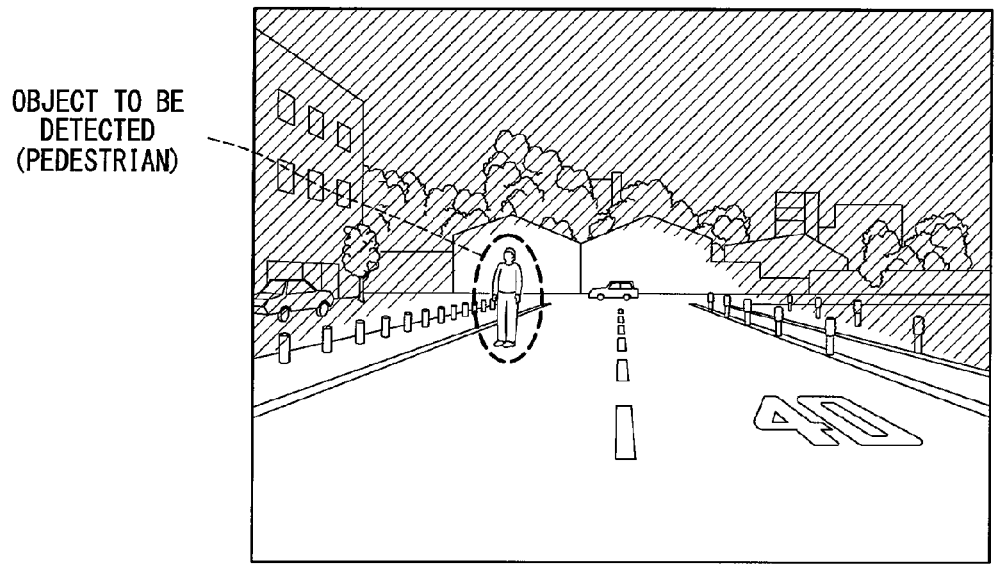
FIG. 6D is an outline view of an image picked up by a night-vision device according to the first embodiment illustrated in FIG. 6B.

On the contrary, according to the night-vision device 1, since the ratio of the luminance value of the near infrared rays and the luminance value of the visible light from the object to be detected falls within the specified luminance range, it may be possible to make the picked-up image an image in which the object to be detected is emphasized (stand out) as illustrated in FIG. 6B and FIG. 6D.

According to the night-vision device 1, even when the luminance around the subject vehicle changes due to the street lights or light of an oncoming vehicle, it may be possible that the ratio of the luminance value of the near infrared rays and the luminance value of the visible light from the object to be detected falls within the specified luminance range.

According to the night-vision device 1, it may be possible that the ratio of the luminance value of the near infrared rays and the luminance value of the visible light from the object to be detected falls within the specified luminance range. As a result, according to the night-vision device 1, it may be possible to generate the image in which the object to be detected is emphasized (stands out).

Therefore, when the object to be detected is detected on the basis of the image picked up by the night-vision device 1, it may be possible to improve the detection performance of the object to be detected. In other words, according to the above night-vision device 1, it may be possible to pick up the image enabling to improve the visibility and improve the detection performance of the object to be detected.

In particular, the set region in the embodiment includes a region corresponding to the ends of the emission range FR along the horizontal direction in the image and includes at least one of right and left sides (roadsides, shoulders, or sidewalks) of the road on which the subject vehicle AM travels.

Since there is a high possibility that a pedestrian or a light vehicle is present on the right and left sides (roadsides, shoulders, or sidewalks) of the road, it may be possible to easily and early recognize the object to be detected such as the pedestrian or the light vehicle according to the night-vision device 1.

In the light projection control in the night-vision processing in the embodiment, the intensity of the near infrared rays is changed on the specified value basis every time a series of cycles from S210 to S280 are executed. For this reason, in the image displayed on the display device 15, it may be possible to prevent the luminance values of the pixels configuring the image from being rapidly changed. Therefore, it may be possible to prevent a person recognizing the image displayed on the display device 15 from having an uncomfortable feeling.

(Other Embodiments)

The embodiments of the present disclosure have been described above. However, the present disclosure is not limited to the embodiments described above, and various modifications can be implemented without departing from the spirit of the present disclosure.

In the first embodiment, the set region is at least one of the right and left sides of the road on which the subject vehicle AM travels. The set region is not limited to this configuration. For example, a strip region provided in the horizontal direction of the subject vehicle AM in the image represented by the image signal may be set as the set region, or an overall region of the image represented by the image signal may be set as the set region. In other words, the set region may be set as any region in which the object to be detected is likely to be present in the image is set.

In the first embodiment, the amount of change in the intensity of the near infrared rays to be changed is calculated so that the determination luminance ratio RR falls within the specified luminance range, and the intensity is changed in the stepwise manner for each of the specified values so that the calculated amount of change is realized. The processing is executed as the control contents of the light projection control. The control contents of the light projection control are not limited to this control contents.

For example, in the light projection control, the intensity of the near infrared rays emitted by the light projecting device 10 may change on the basis of a specified value defined in advance every time a series of cycles from S210 to S280 are executed without calculating the amount of change. The amount of change in the intensity of the near infrared rays to be changed so that the determination luminance ratio RR falls within the specified luminance range may be calculated, and the calculated amount of change in the intensity of the near infrared rays may be changed by a single control.

The light projection control may be performed by any contents when the light projecting device 10 is controlled so that the determination luminance ratio RR falls within the specified luminance range. In the embodiment, the determination luminance ratio RR is calculated by dividing a total of the red luminance values in all of the pixels configuring the set region by a total of the near infrared luminance values in all of the pixels configuring the set region. A method of calculating the determination luminance ratio RR is not limited to this manner.

For example, a total of the green luminance values in all of the pixels configuring the set region may be divided by the total of the near infrared luminance values in all of the pixels configuring the set region, or a total of the blue luminance values in all of the pixels configuring the set region may be divided by the total of the near infrared luminance values. Also, a total of the red luminance values, the green luminance values, and the blue luminance values in all of the pixels configuring the set region may be divided by the total of the near infrared luminance values in all of the pixels configuring the set region.

The image pickup device 5 according to the first embodiment has the RGB-IR filters as the optical filters. However, the optical filters provided in the image pickup device 5 are not limited to the RGB-IR filters, but may be CyMgYe-IR filters. The optical filters according to the present invention may be any type of filters that are configured by adding the near infrared ray filter to the visible light filter.

When the optical filters in the image pickup device 5 are configured by the CyMgYe-IR filters, a sum of the luminance values based on signals from the light receiving elements that receive the light passing through at least one of Cy, Mg, and Ye filters may be set as the determination luminance ratio RR. At least one sum of the red luminance value LR, the blue luminance value LB, and the green luminance value LG calculated on the basis of the light passing through Cy, Mg, and Ye filters may be set as the determination luminance ratio RR.

Incidentally, the image picked up by the image pickup device 5 in the above first embodiment is a still image, but the contents picked up by the image pickup device 5 are not limited to the still image, but may be video. In other words, the image pickup device 5 may be a camera that captures a moving picture.

In the above first embodiment, the night-vision ECU 50 is configured separately from the image pickup device 5. However, the night-vision ECU 50 may be provided in the image pickup device 5, or may be provided in the light projecting device 10.

The night-vision device 1 according to the above first embodiment provides both of the display device 15 and the sound output device 20 as informing mechanisms. However, devices provided as the informing mechanisms are not limited to those configurations, but may be configured by, for example, any one of the display device 15 and the sound output device 20.

The present disclosure is not interpreted with the limit by the above embodiments. Modes in which a part of the configurations of the above embodiments may be omitted as long as the problem can be solved are also encompassed by the embodiments of the disclosure. Modes configured by appropriate combinations of the above embodiments with the modified example are also encompassed by the embodiments of the present disclosure.

The invention claimed is:

1. A night-vision device mounted to a vehicle comprising:
    a light projecting unit emitting near infrared rays to an emission range that is predetermined as a spatial region around a subject vehicle;
    an image pickup unit receiving a light from a specified space defined as the spatial region around the subject vehicle including the emission range through either of a near-infrared filter that passes near-infrared rays and a visible light filter that passes visible light with each of a plurality of light receiving elements arrayed in a mosaic pattern so as each of the plurality of light receiving elements to obtain an image signal representing an image in which the specified space is projected onto a plane including a plurality of pixels having a luminance value of the near-infrared rays and a luminance value of the visible light;

a luminance ratio determining unit executing a luminance ratio determination that determines whether a determination luminance ratio that is a ratio of the luminance value of the near-infrared rays and the luminance value of the visible light in a pixel configuring a set region is within a specified luminance range that is predetermined as a range of a ratio of the luminance value of an image in which an object to be detected is emphasized, wherein the set region is a region that is set in at least a part of the image represented by the image signal obtained by the image pickup unit and that includes at least one pixel in which the object to be detected is likely to be present; and a light projection control unit executing a light projection control that controls an intensity of the near-infrared rays emitted by the light projecting unit so as the determination luminance ratio to be within the specified luminance range when the determination luminance ratio exceeds the specified luminance range as a result of the luminance ratio determination in the luminance ratio determining unit.

2. The night-vision device according to claim 1, wherein the emission range is a space over a road on which the subject vehicle travels, and the set region is at least one of right and left sides in the space over the road in the image represented by the image signal obtained by the image pickup unit.

3. The night-vision device according to claim 1, wherein the set region is a strip region disposed in a horizontal direction of the subject vehicle in the image represented by the image signal obtained by the image pickup unit.

4. The night-vision device according to claim 1, wherein the set region is an overall region of the image represented by the image signal obtained by the image pickup unit.

5. The night-vision device according to claim 1, wherein the light projection control unit calculates the intensity of the near infrared rays when the determination luminance ratio is within the specified luminance range, and changes the intensity to the calculated intensity of the near infrared rays for each of predetermined specified value as the light projection control.

6. The night-vision device according to claim 1, wherein the light projection control unit changes the intensity of the near infrared rays emitted by the light projecting unit for each of predetermined specified value as the light projection control.

7. The night-vision device according to claim 1, wherein the light projection control unit calculates the intensity of the near infrared rays when the determination luminance ratio is within the specified luminance range, and changes the intensity to the calculated intensity of the near infrared rays as the light projection control.

* * * * *